United States Patent [19]

Adler et al.

[11] 3,919,465

[45] Nov. 11, 1975

[54] OPTICAL SYSTEM FOR DIRECTLY DETECTING SPATIALLY RECORDED SIGNALS

[75] Inventors: Robert Adler, Northfield; Leonard J. Laub, Chicago, both of Ill.

[73] Assignee: Zenith Radio Corporation, Chicago, Ill.

[22] Filed: Jan. 14, 1974

[21] Appl. No.: 433,035

[52] U.S. Cl. .................... 178/6.6 R; 179/100.3 G; 179/100.3 V; 178/6.7 A

[51] Int. Cl.$^2$ .................... G11B 11/00; H04N 3/06

[58] Field of Search ............ 179/100.3 V, 100.3 G, 179/100.3 B, 100.4 A, 100.4 R; 178/6.6 TP, 6.6 A, 6.6 R

[56] References Cited

UNITED STATES PATENTS

| | | | |
|---|---|---|---|
| 3,235,672 | 2/1966 | Beguin | 179/100.3 V |
| 3,281,798 | 10/1966 | Glenn, Jr. | 178/6.6 TP |
| 3,391,255 | 7/1968 | Gregg | 179/100.3 V |
| 3,654,401 | 4/1972 | Dickopp et al. | 179/100.3 V |
| 3,732,363 | 5/1973 | Glenn, Jr. | 179/100.3 G |
| 3,818,148 | 6/1974 | Dickopp | 179/100.3 V |
| 3,865,996 | 2/1975 | Kato | 179/100.3 G |

OTHER PUBLICATIONS

On Printing Motion by P. Kramer and K. Compaan, Eduology Vol. 4, Issue 1, 1973.

*Primary Examiner*—Bernard Konick
*Assistant Examiner*—David K. Moore
*Attorney, Agent, or Firm*—Cornelius J. O'Connor

[57] ABSTRACT

An optical detection system for directly detecting a time dependent information signal converted to a frequency modulated carrier and spatially recorded upon a disc to form a diffraction grating in the shape of a spiral track. The grating includes a first spatial pattern representative of the modulated carrier signal and a second spatial pattern representative of the information signal. A support is provided for the disc. A source of light and a focusing lens for producing an illuminating spot are disposed adjacent the disc. The lens has a numerical aperture such that the spot is capable of resolving any portion of the second spatial pattern but incapable of resolving any portion of the first spatial pattern. Illumination of the track by the spot produces a diffraction pattern of the beam in which the angular displacement of at least one component of the diffracted beam, from a reference position, is established by that portion of the second spatial pattern recorded upon the illuminated segment of the track. This displacement is representative of an instantaneous value of the information signal. The disc is driven at a predetermined speed to effect a scan of the track by the spot to develop a time-varying beam diffraction pattern which comprises at least one time-varying beam component that generates a pattern of displacements related to the second spatial pattern. A light detector is positioned to monitor the aforesaid pattern of time-varying beam component displacements to derive an electrical signal corresponding to the information signal.

8 Claims, 6 Drawing Figures

OPTICAL SYSTEM FOR DIRECTLY DETECTING SPATIALLY RECORDED SIGNALS

The present invention relates in general to an arrangement for retrieving recorded information. More particularly, it relates to an optical system for directly detecting time dependent information signals which have been spatially recorded upon a disc.

BACKGROUND OF THE INVENTION

One approach to the recording of video information upon a disc contemplates converting the instantaneous amplitude of the video signal to a corresponding frequency modulation of a carrier which has a frequency at least twice that of the highest frequency information signal. In a system of the type herein to be considered, the recorded video information to be detected will include signals approaching 3.5MHz, thus necessitating a carrier of at least 7.0MHz. This modulated carrier is recorded upon the disc as an elongated spiral track, which track may take the form of an undulating groove or, alternatively, a train of markings. In the first case, discs are made from a master upon which a track is mechanically cut by a stylus, using known techniques, to produce a groove within which the video information is impressed, for example, as hill and dale contour. In the alternative case, photographic techniques may be employed to create a master from which discs are pressed having information stored in a track formed as a train of cavities or pits. In any event, the resulting track is characterized by a construction in which the frequency modulated carrier is physically represented by the spatial frequencies of hills and dales, or pits.

The retrieval of video information stored upon a disc poses a number of problems not the least of which concerns the signal detection apparatus and circuitry. The information carried by a grooved disc is usually recovered by monitoring the groove with a stylus which is coupled to a piezoelectric device that derives an electrical signal corresponding to the original frequency modulated carrier. The information stored in a train of pits is retrieved by addressing the track with a beam of light and then reading the light transmitted through the disc, or reflected therefrom, with a light detector. In this case the light detector serves as a generator which develops an electrical signal that corresponds to the frequency modulated carrier. It should also be appreciated that the information stored in grooved disc can be retrieved by optical signal detection techniques. In any event the derived electrical signal is then processed through an FM discriminator or a ratio detector in order to extract the original information signal.

In current optical detection practice the electrical signal is derived by focusing the light of a laser beam to form a reading spot small enough to resolve the spatial frequency of the frequency modulated carrier. As will be shown this imposes severe requirements on the focus control apparatus to insure that vertical excursions of that portion of the disc presented to the reading spot are restricted to a very narrow range since the depth of focus of an optical system capable of resolving a spatial carrier frequency in the other of several thousand wavelengths per centimeter, corresponding to a temporal frequency of 7.0MHz at the disc diameters and rotational speeds usually employed, is of necessity very shallow.

Accordingly, it is a general object of the invention to provide a new and improved optical system for detecting information signals stored upon a video disc.

It is a specific object of the invention to provide an optical system which directly detects a recorded frequency modulated signal without recourse to a discriminator or ratio detector.

It is also an object of the invention to provide an optical signal detection system which alleviates the depth of focus criticality of prior optical detection systems.

SUMMARY OF THE INVENTION

In accordance with the invention an optical detection system is disclosed for directly detecting a time dependent information signal which has been converted to a frequency modulated carrier and spatially recorded upon a storage medium to form a light diffraction grating in the shape of an elongated spiral track. The grating includes a first spatial pattern representative of the modulated carrier signal and a second spatial pattern representative of the information signal. The optical detection system itself comprises means for supporting the storage medium, means for producing a beam of coherent light and means disposed adjacent the storage medium for focusing the beam to produce an illuminating spot. The focusing means has a numerical aperture such that the spot is capable of resolving any portion of the second spatial pattern corresponding to the highest frequency in the information signal but is incapable of resolving any portion of the first spatial pattern corresponding to the lowest instantaneous frequency of the modulated carrier. As a result, illumination of the track with the spot produces a diffraction pattern of the beam in which the angular displacement of at least one component of the diffracted beam, from a reference position, is established by that portion of the second spatial pattern recorded upon the illuminated segment of the track. This angular displacement is representative of an instantaneous value of the information signal. Drive means are provided for displacing the medium, relative to the illuminating spot, at a predetermined velocity to effect the scan of the track by the spot to develop a time-varying beam diffraction pattern comprising at least one time-varying diffracted beam component that generates a sequence, or temporal pattern of displacements which are related to the second spatial pattern. Finally, light responsive means are provided to derive from the pattern of time-varying beam component displacements an electrical signal corresponding to the information signal.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Prior to commencing discussion of the invention it should be noted that the illustrations of portions of the disclosed optical detection system, as well as certain explanatory diagrams, have been intentionally exaggerated in order to facilitate the presentation and understanding of the invention.

Figures 1, 2:
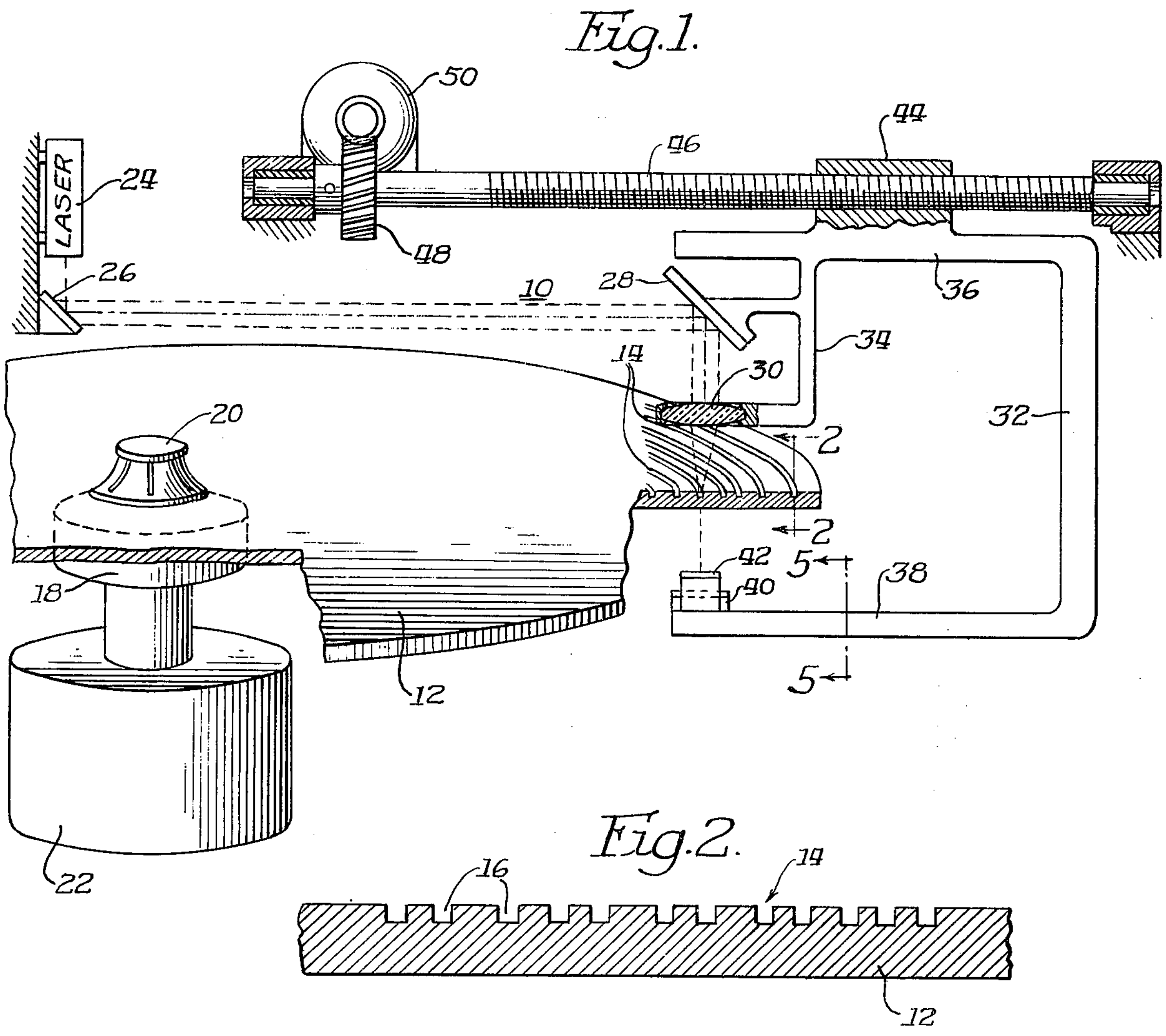
FIG. 1 is a fragmentary elevational view of an optical video detecting system.
FIG. 2 is a cross-sectional view of a portion of a video disc as viewed along lines 2—2 in FIG. 1 and detailing a part of a longitudinal section of a spatially recorded track.

Accordingly, and as will be shown, the optical playback system 10 depicted in FIG. 1 serves to directly detect time dependent information signals, for example, video signals, which have been converted to a frequency modulated carrier and spatially recorded upon the surface of a storage medium, such as a disc 12, which disc preferably comprises a thin foil of polyvinyl chloride. The particular manner in which the information signal is recorded upon the disc is of no concern in that resort may be had to either the mechanical or photographic techniques adverted to above. For purposes of discussion it will be assumed that the recorded information adopts the shape of elongated spiral track 14 comprising a train of pits 16 impressed in the upper surface of disc 12; a longitudinal section through a portion of the track is shown in FIG. 2.

This track, or train of pits, forms a light diffraction grating which includes a first spatial pattern representative of the modulated carrier signal and a second spatial pattern representative of the information signal. In this regard the aforementioned first spatial pattern can be said to be established by the totality of the pits with the spacing, for example, between adjacent ones corresponding to an instantaneous frequency of the modulated carrier while the second spatial pattern can be established by groupings of pits, any group of which is representative of the instantaneous value of the modulating information signal.

The conventional approach to optically detecting information stored upon a disc contemplates monitoring the track with a beam of coherent light. The beam is converged by an optical focusing apparatus having a relatively high numerical aperture (NA) so that the illuminating or reading spot derived therefrom is of such a minute dimension as to be capable of resolving the highest spatial frequency of the recorded modulated carrier. In other words, the spot must be able to analyze increments of the carrier signal as represented by a pair of pits. Of necessity, an optical system of such capability is characterized by an extremely small depth of focus (DF) which is another way of saying that the range within which the spot remains in usable focus is very shallow.

Figure 3:
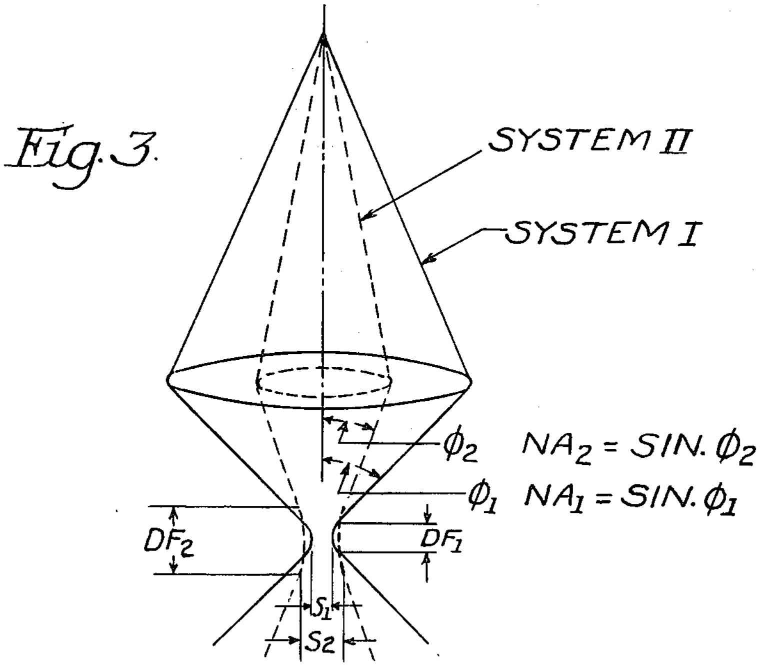
FIG. 3 is a schematic representation of the relative resolving properties of a pair of optical systems.

The relationship between NA and DF is probably most readily perceived by reference to FIG. 3 wherein these characteristics are schematically depicted for two different optical systems. NA, by definition, is equal to the sine of one-half of the cone angle of the focused beam. Accordingly, a reading spot having an effective diameter $S_1$ is formed by System I of numerical aperture $NA_1$ from a beam characterized by a relatively wide cone angle $\phi_1$. Conversely, a larger reading spot $S_2$ is formed by System II from a beam having a relatively narrow cone $\phi_2$ and, consequently, of lower aperture $NA_2$.

Turning now to the depth of focus consideration, FIG. 3 clearly illustrates that the range $DF_2$ over which spot $S_2$ remains substantially in focus is significantly greater than the range $DF_1$ through which $S_1$ retains usable focus.

Figures 4, 5, 6:
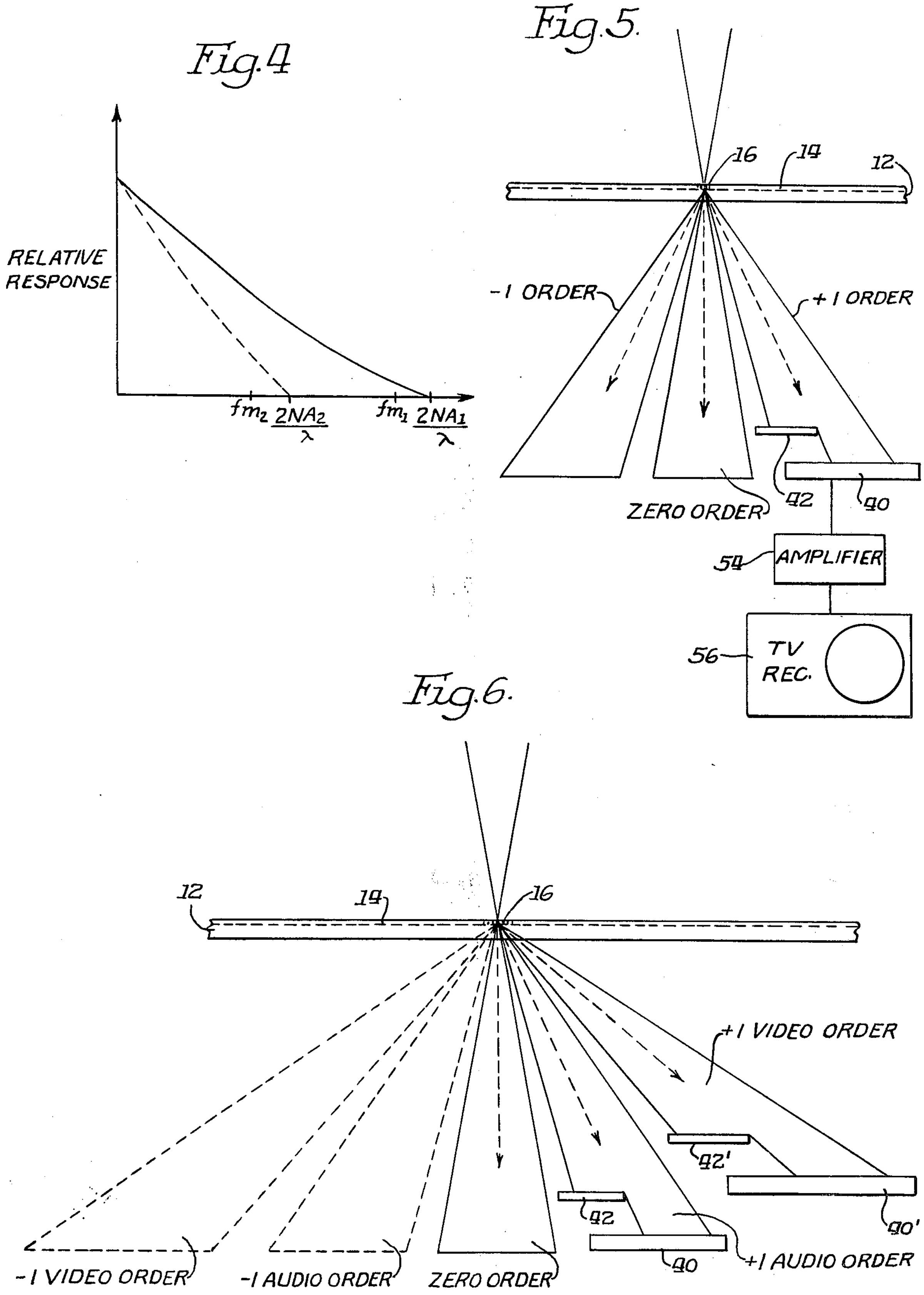
FIG. 4 is a graphical illustration of the relative spatial frequency responses of the optical systems of FIG. 3.
FIG. 5 is a schematic representation of the optical detector portion of FIG. 1 as viewed along lines 5—5.
FIG. 6 is a schematic representation of an optical detector arrangement for use in an additional embodiment of the invention.

Attention is now directed to FIG. 4 which graphically depicts exemplary responses of a pair of optical systems of the type shown in FIG. 3. It can be accepted as a fundamental that $2NA/\lambda$ defines the spatial cut-off frequency of a system characterized by a particular NA and working with light of wavelength λ, see Principles of Optics by Born and Wolf, 3rd Ed. sec. 9.5. Now, in order for a spatially recorded signal to be resolved by an optical system, the cut-off frequency of the system must be greater than the spatial frequency of the recorded signal. In practice, of course, the highest spatial frequencies that can be utilized, $f_{m1}$ and $f_{m2}$ are, as indicated, somewhat less than the cut-off frequencies of their respective optical systems. In any event, it is apparent from an inspection of FIG. 4 that the resolving capability of an optical system is a function of its numerical aperture. With this thought in mind the optical system now to be described is one having an NA such that the system is capable of resolving the spatially recorded counterpart of the highest frequency in the information signal spectrum but incapable of resolving the spatial counterpart of the lowest instantaneous frequency of the carrier.

Turning now to the structural details of system 10, as shown in FIG. 1 disc 12 is supported upon the spindle 18 of a playback deck and secured thereon by a cap 20. The lower extremity of the spindle is coupled to a synchronous motor 22 which serves to rotate the disc at a predetermined velocity. In order to read track 14, optical detection system 10 utilizes a beam of monochromatic coherent light which is produced by the laser 24. The laser may be positioned at any convenient location since the beam derived therefrom can be directed by the mirrors 26, 28 to the focusing means, specifically the objective lens 30. Lens 30 has a numerical aperture which is such that the illuminating spot produced by it is capable of resolving any portion of the spatial pattern corresponding to the highest frequency in the information signal but is incapable of resolving any portion of the spatial pattern corresponding to the lowest instantaneous frequency of the modulated carrier. In other words, the spot produced by lens 30 is of such a size as to span a number of pits 16. It is small enough to detect the highest frequency in the information signal, but too large to detect the individual pits even at the lowest modulated carrier frequency.

To enable the spot produced by the lens to monitor track 14, lens 30 and mirror 28 are supported upon a carriage 32 for conjoint travel along a path normal to the track and thus coincident with a radius extending from the center of the disc. More particularly, lens 30 and mirror 28 are carried by an arm 34 which depends from an upper frame member 36 of the carriage. A lower frame member 38 of the carriage supports a light responsive means such as a photodetector 40 as well as a light control means, in the form of a knife edge 42 which is positioned so that its longitudinal edge is disposed perpendicular to track 14. This knife edge serves to control the area of the photodetector exposed to the light passing through the disc. Frame member 38 is arranged so as to position the photodetector and knife edge immediately below lend 30 but sufficiently spaced therefrom to permit passage of disc 12.

To facilitate a controlled radial displacement of the optical reading apparatus, carriage 32 includes a housing portion 44 which threadably receives a rotatably mounted lead screw 46. The lead screw is effectively oriented perpendicular to track 14 of the disc to assure accurate radial travel of the lens and light detector. A pinion 48, fitted to one end of the lead screw, couples the lead screw to a driver 50 which can comprise an electric motor and gearing complex designed to coordinate the radial displacement of the carriage with the rotational displacement of the disc.

In a manner now to be described illumination of a segment of the light diffraction grating 14 by the light spot developed by lens 30 produces a beam diffraction pattern in which the angular displacement of at least one component of the diffracted beam from a reference position is representative of an instantaneous value of the recorded information signal. The aforesaid beam diffraction pattern, which is schematically illustrated in FIG. 5, is seen to comprise a principal or zero order component and a pair of angularly displaced components, conventionally designated +1 order and −1 order. Illustrative ones of such beam components, representative of an instantaneous value of a recorded signal, are depicted in FIG. 5 by a broken-line arrow construction. While other diffraction orders are present their intensities are so small they can be ignored. Moreover, since the +1 and −1 orders convey the same information, it is sufficient to monitor but one of these orders to recover the recorded signal. Accordingly, and as shown in FIG. 5, the +1 order is selected by positioning photodetector 42 to intercept that portion of the diffracted beam component which falls outside the shadow of knife edge 42. Preferably, the knife edge is positioned so that its right hand edge, as viewed in FIG. 5, is located at approximately the center of the pattern constituting the +1 order. Energized in this fashion, the photodetector generates an electrical signal which is proportional to the quantity of light impinging upon its light sensitive surface and thus representative of an instantaneous value of the recorded information signal.

In operation drive motor 22 is actuated to displace the disc 12, relative to the light spot, at a predetermined velocity. Simultaneously, motor 50 is energized to effect a controlled inward radial displacement of the objective lens and the photodetection elements 40, 42 to effect a scan of the spiral track. As the diffraction grating formed by track 14 passes beneath the illuminating spot a time-varying beam diffraction pattern is developed. Since the angularly displaced beam components are timevarying, they generate, in addition to a zero order, the +1 order and −1 order fan-shaped patterns of displacements shown in FIG. 5, which patterns relate to a spatial pattern formed on the track and thus represent a portion of an information signal. Again, confining attention to the +1 order (since both patterns of beam displacements carry the same information) when the illuminating spot is scanning the track the generated +1 order pattern will comprise a myriad of components individually representative of an instantaneous value of the information signal and collectively representative of a portion of the information signal itself. The instantaneous position of, say, the +1 order is a function of the instantaneous frequency of the carrier. This, in turn, is a function of the instantaneous value of the information signal and of the standards (carrier frequency and deviation) one has adopted. Since the carrier frequency never drops below some minimum value, say 6MHz, the instantaneous value of the +1 order never gets closer to the zero order than a position corresponding to 6MHz. Accordingly, as indicated by the fan-shaped patterns, the beam components in the +1 order range from a position adjacent to but spaced from the zero order pattern to an angularly displaced position corresponding to the highest instantaneous carrier frequency recorded on the track.

Now, since the beam diffraction pattern is determined by the spatial frequency of that portion of the track grating under illumination, it follows that the angular displacement of a beam component represents an instantaneous value of the recorded signal. Moreover, since the knife edge determines the surface area of the photodetector available for exposure to the time-varying diffracted beam components, it can be concluded that a diffracted beam component of substantial angular displacement will flood the surface of the photodetector with more light energy than a beam component of lesser angular displacement. It then follows that the electrical signal derived by the photodetector will have a variation corresponding to the angular excursions of the time-varying beam components. As a result the electrical signal derived by the photodetector corresponds directly to the video signal spatially recorded on the disc. This derived signal is then coupled to an amplifier 54 prior to application to a television receiver 56 for ultimate utilization. It is of particular significance that the disclosed optical system serves to detect the information signal directly without recourse to the familiar discriminator or ratio detector normally associated with detection of a frequency modulated signal.

While a photodetector-knife-edge arrangement has been detailed, it is appreciated that a detector comprising a pair of spaced light detector portions can be substituted for elements 40, 42. In this alternative arrangement a split diode is positioned so that the time-varying diffracted beam components are shared by the two detector portions, the ratio being determined by their instantaneous angular positions. In this fashion, two independent output signals, individually a measure of the extent of beam component displacement, are derived. Preferably, these two output signals are then coupled to processing means, such as a differential amplifier, for developing an electrical signal corresponding to the information signal spatially recorded on the disc.

DESCRIPTION OF AN ALTERNATE EMBODIMENT

As described, the invention contemplates direct detection of an information signal recorded upon a disc. It is also within the purview of the invention to achieve direct detection, with a single illuminating spot, of two or more channels which have been recorded upon the same track. For purposes of illustration, assume that each of two different information signals, e.g., a video signal and its associated audio information, are employed to frequency modulate a pair of carriers which are frequency spaced a distance that will preclude interference or cross-talk therebetween. The two frequency modulated carriers, $F_1$ and $F_2$, are then recorded upon a disc by one of the procedures described above. The resulting record track will comprise a grating that includes a first plurality of spatial patterns representative of the modulated carrier signals and a second plurality of spatial patterns representative of the information signals. Specifically, the first plurality will include first and second spatial patterns representative, respectively, of modulated carrier $F_1$ and the video information, while the second plurality will include third and fourth spatial patterns representative, respectively, of modulated carrier $F_2$ and the audio information.

Insofar as an optical detection system for a multichannel recording is concerned, the basic arrangement already shown in FIG. 5 is duplicated.

The focusing means, of course, must have a numerical aperture such that the illuminating spot produced by it is capable of resolving any portion of any of the second plurality of patterns corresponding to the highest frequency in any of the information signals but is incapable of resolving any portion of any of the first plurality of patterns corresponding to the lowest instantaneous frequency of any of the frequency modulated carriers. Thus, upon illumination of a segment of this diffraction grating by the aforesaid spot, there is produced a beam diffraction pattern in which a plurality of discrete angular displacements of at least one component of the diffracted beam, from a reference position, are established by the respective portions of the second plurality of patterns. These discrete angular displacements are representative of the instantaneous values of respective ones of the aforementioned plurality of information signals. The pattern of displacements representative of instantaneous values of the audio information signal is designated in FIG. 6 as the +1 audio order while the pattern of displacements representative of instantaneous values of the video information signal is designated as the +1 video order. More particularly, and as shown in FIG. 6, the photodetection apparatus for a multi-channel track comprises, in addition to the previously described photodetector 40 and its associated knife edge 42, a second pair of substantially similar elements 40', 42'. In order to retrieve the two channels of information, it is required that one set of elements, say 40 and 42, be positioned so that they respond to the pattern of time-varying beam component displacements produced by the spatial pattern associated with the audio signal while the other set of detector elements 40', 42' are positioned so that they respond to the pattern of beam component displacements produced by the spatial pattern representative of the video signal. This mode of detection is realizable because the time-varying pattern of beam components corresponding to one band of frequencies is distinguishable from the pattern derived from a different frequency band. This obtains because the beam diffraction angle is a function of spatial frequency with the higher order spatial frequencies producing a greater diffraction angle. Thus the elements 40', 42' being positioned farthest from the zero reference component will detect the video signals while the other elements 40, 42 will retrieve the audio information.

Accordingly, insofar as direct optical detection of two or more information signals, it has been shown it is principally a matter of selectively positioning the photodetector elements within the diffraction patterns.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An optical system for directly detecting a time dependent information signal converted to a frequency modulated carrier and spatially recorded upon a record disc to form, effectively, a one dimensional light diffraction grating in the shape of an elongated spiral track, which grating includes a first spatial pattern representative of the modulated carrier signal and a second spatial pattern representative of the information signal, said optical detection system comprising:

means for supporting said record disc;

means for producing a beam of light;

means disposed adjacent said disc for receiving and focusing said beam to produce an illuminating spot, said means having a numerical aperture that establishes a predetermined dimension for said spot so that said spot, so dimensioned, is restricted to resolving only portions of said second spatial pattern corresponding to frequencies in said information signal, and, said dimensioned spot being incapable of resolving any portion of said first spatial pattern corresponding to any instantaneous frequency of the modulated carrier, so that illumination of said track by said dimensioned spot produces a diffraction pattern of said beam in which the angular displacement of a first order component of said diffracted beam, from a reference position, is established by that portion of said second spatial pattern recorded upon the illuminated segment of the track and is representative of an instantaneous value of said information signal;

drive means for rotating said disc, relative to said dimensioned illuminating spot, at a predetermined velocity and for simultaneously effecting a progression of said focusing means normal to said spiral track, to effect a scan of said track by said dimensioned spot to develop, in a plane substantially parallel to said track, a time-varying beam diffraction pattern comprising at least one first order time-varying diffracted beam component that generates a pattern of displacements related to said second spatial pattern; and light responsive means positioned to monitor only said pattern of time-varying first order beam component displacements for deriving an electrical signal corresponding to said information signal thereby effecting a direct detection of said information from said frequency modulated carrier.

2. An optical system as set forth in claim 1 in which said light responsive means comprises a photodetector and which further includes means interposed in the path of said time-varying diffracted beam component for controlling, in response to said generated pattern of displacements, the intensity of said time-varying beam component admitted to said photodetector.

3. An optical system as set forth in claim 2 in which said beam intensity control means comprises a knife edge.

4. An optical system as set forth in claim 3 in which said medium comprises a substantially circular disc and in which said knife edge comprises a principal longitudinal portion aligned perpendicular to the recorded track on said disc.

5. An optical system as set forth in claim 1 in which said light responsive means comprises a pair of light detectors individually deriving output signals, and which further includes processing means, responsive to said output signals, for developing said electrical signals corresponding to said information signal.

6. An optical system as set forth in claim 5 in which said light responsive means comprises a split-diode photodetector.

7. An optical system for directly detecting, simultaneously, a plurality of time dependent information signals converted to a like plurality of frequency modulated carriers and spatially recorded upon a record disc to form, effectively, a one dimensional light diffraction grating in the shape of an elongated spiral track, which grating includes a first plurality of spatial patterns representative of the modulated carrier signals and a second plurality of spatial patterns representative of the information signals, said optical detection system comprising:

means for supporting said record disc;

means for producing a beam of coherent light;

means disposed adjacent said disc for receiving and focusing said beam to produce an illuminating spot, said means having a numerical aperture that establishes a predetermined dimension for said spot so that said spot, so dimensioned, is restricted to resolving only portions of any of said second plurality of patterns corresponding to frequencies in any of said information signals, and, said dimensioned spot being incapable of resolving any portion of any of said first plurality of patterns corresponding to any instantaneous frequency of any of the frequency modulated carriers, so that illumination of said track by said dimensioned spot produces a diffraction pattern of said beam in which a plurality of discrete angular displacements of a first order component of said diffracted beam, from a reference position, are established by the respective portions of said second plurality of spatial patterns recorded upon the illuminated segment of the track and are representative of the instantaneous values of respective ones of said plurality of information signals;

drive means for rotating said disc, relative to said dimensioned illuminating spot, at a predetermined velocity and for simultaneously effecting a progression of said focusing means normal to said spiral track, to effect a scan of said track by said dimensioned spot to develop, in a plane substantially parallel to said track, a time-varying diffraction pattern comprising at least one first order time-varying diffracted beam component that generates a plurality of patterns of displacements related to said second plurality of spatial patterns; and a plurality of light responsive devices positioned to monitor only assigned ones of said patterns of said first order time-varying beam component displacements for deriving a plurality of electrical signals corresponding to respective ones of said plurality of information signals thereby effecting a direct detection of said information from said frequency modulated carriers.

8. An optical system as set forth in claim 7 which further includes a plurality of control means interposed in the path of said time-varying diffracted beam component for controlling, in response to said plurality of said generated patterns of displacements, the intensity of said time-varying beam component admitted to said light responsive devices.

* * * * *